United States Patent
Funck (10) Patent No.: US 9,968,029 B2
(45) Date of Patent: May 15, 2018

(54) METHOD FOR METERING GRANULAR MATERIAL AND APPARATUS FOR METERING GRANULAR MATERIAL

(71) Applicant: Horsch Maschinen GmbH, Schwandorf (DE)

(72) Inventor: Gerald Funck, Schatthausen (DE)

(73) Assignee: HORSCH MASCHINEN GMBH, Schwandorf (DE)

(*) Notice: Subject to any disclaimer, the term of this patent is extended or adjusted under 35 U.S.C. 154(b) by 33 days.

(21) Appl. No.: 14/908,367

(22) PCT Filed: Aug. 1, 2014

(86) PCT No.: PCT/EP2014/066608
§ 371 (c)(1),
(2) Date: Jan. 28, 2016

(87) PCT Pub. No.: WO2015/014991
PCT Pub. Date: Feb. 5, 2015

(65) Prior Publication Data
US 2016/0157417 A1    Jun. 9, 2016

(30) Foreign Application Priority Data
Aug. 1, 2013    (DE) .................. 10 2013 215 182

(51) Int. Cl.
*A01C 7/04*    (2006.01)
*A01C 7/16*    (2006.01)
(Continued)

(52) U.S. Cl.
CPC ............... *A01C 7/081* (2013.01); *A01C 7/04* (2013.01); *A01C 7/046* (2013.01); *A01C 7/166* (2013.01);
(Continued)

(58) Field of Classification Search
CPC .. A01C 7/04; A01C 7/00; A01C 7/046; A01C 7/044; A01C 7/042; A01C 7/166;
(Continued)

(56) References Cited

U.S. PATENT DOCUMENTS

2015/0122162 A1    5/2015    Horsch
2015/0163991 A1    6/2015    Funck

FOREIGN PATENT DOCUMENTS

DE            1044487 B        11/1958
DE    102012105048 A1      12/2013
(Continued)

OTHER PUBLICATIONS

English translation of International Search Report dated Oct. 29, 2014 for corresponding International Application No. PCT/EP2014/066608.
(Continued)

*Primary Examiner* — Christopher J. Novosad
(74) *Attorney, Agent, or Firm* — Erickson Kernell IP, LLC (57) ABSTRACT

In a method for metering granular material, and in a corresponding metering apparatus, the granular material is carried and conveyed by an airflow and/or by its own kinetic energy and directed through a feed tube into a metering unit, where it is guided along an approximately circular arc path and tangentially directed into an outlet tube, which is adjacent to the metering unit and which runs, at least in a section, slightly curved. The granular material is approximately evenly spaced or evenly metered and conveyed in an outer area of the curved outlet tube and is at least partially carried by the airflow being discharged and exiting the metering unit through the outlet tube.

21 Claims, 4 Drawing Sheets

(51) Int. Cl.
- *A01C 7/20* (2006.01)
- *A01C 15/04* (2006.01)
- *A01C 21/00* (2006.01)
- *A01C 7/08* (2006.01)

(52) U.S. Cl.
CPC .............. *A01C 7/206* (2013.01); *A01C 15/04* (2013.01); *A01C 21/002* (2013.01)

(58) Field of Classification Search
CPC .. A01C 7/16; A01C 7/08; A01C 7/206; A01C 7/20; A01C 15/04; A01C 15/00; A01C 21/002; A01C 21/00; A01C 7/081
See application file for complete search history.

(56) References Cited

FOREIGN PATENT DOCUMENTS

| | | |
|---|---|---|
| EP | 1234489 A2 | 8/2002 |
| WO | 2004004441 A1 | 1/2004 |
| WO | 2012167372 A1 | 12/2012 |
| WO | 2013186161 A1 | 12/2013 |
| WO | 2013186175 A1 | 12/2013 |

OTHER PUBLICATIONS

English language translation of the International Preliminary Report on Patentability and Written Opinion issued by WIPO dated Feb. 2, 2016 for corresponding International Application No. PCT/EP2014/066608.

METHOD FOR METERING GRANULAR MATERIAL AND APPARATUS FOR METERING GRANULAR MATERIAL

CROSS-REFERENCE TO RELATED APPLICATIONS

This application claims priority from German Application No. DE 10 2013 215 182.9 filed Aug. 1, 2013, the contents of which are incorporated herein by this reference.

The present invention relates to a method for metering granular material, such as seeds, fertilizer, or the like, as well as to a metering apparatus for such granular material with the features of the independent claims. The granular material is carried and conveyed by an airflow and directed through a feed line into a metering unit and then directed to an outlet tube tangentially adjacent to the metering unit, which outlet tube runs, at least sectionwise, in a straight line or slightly curved.

Various approaches are known from the prior art for improving seed drilling to the effect that sowing is carried out more evenly. The most important objective pursued in this context lies in not letting the grain distances vary too much within a row in order to thus at least roughly approximate a single grain sowing.

WO 2012/167372 A1 describes a delay apparatus for granular material, which is being carried by an air stream. The apparatus comprises a seed drill coulter with a seed tube, which is equipped with an air duct for the seeds to be placed into the soil. In order to reduce the conveying velocity and fall velocity of the seeds shortly prior to the placement into the soil, the conveying tube is guided in a helical path such that the grains are steadied and can be placed into the soil at a reduced or homogenized velocity, respectively.

DE 10 2012 105 048 A1, which was published after the priority date of the present application, describes a distribution unit for granular material, which can be employed, in particular, as a sowing unit. A profiled conveyor disk rotates in a housing, which conveyor disk, in interaction with the housing design and its contoured inner cover surface, provides for a separation of the grains carried into the housing by means of an air stream such that the seeds can be released from the housing at approximately even grain distances after their separation. Excess grains or such grains as would disturb the even grain spacing, respectively, remain in the housing and are circulated therein again or repeatedly, as the case may be.

Since single grain sowing has not yet been able to prevail due to various reasons, essentially, however, due to economic reasons, the present method according to the invention attempts to improve the grain singulation for pneumatically supported sowing in customary seed-drill machines so far that it can be referred to as a largely equidistant sowing, which comes at least very close to a single grain sowing.

A first objective of the present invention thus lies in providing such an improved grain singulation method, which is not only suitable for large seeds, such as corn, but also for other grain types such as sunflower seeds or rapeseed. This first objective of the invention is achieved by the subject matter of the independent method claim; features of further advantageous developments of the invention are found in the dependent claims.

The present invention thus provides a method for metering granular material, such as seeds, fertilizer, or the like. The method can be employed, in particular, within a distribution unit or sowing unit of a distribution machine or sowing machine. The granular material being carried and conveyed by an airflow and/or by its own kinetic energy is directed through a feed tube into a metering unit, where it is guided along an approximately circular arc path and tangentially directed into an outlet tube, which is adjacent to the metering unit and which at least a section of which is slightly curved. The method provides that the granular material being approximately equidistantly and/or evenly metered and conveyed in an external area of the curved outlet tube is carried largely or completely by the airflow being discharged from and exiting the metering unit through the outlet tube, or is conveyed therein by its own kinetic energy. Optionally, the granular material can also be carried by a portion of the air stream, if another part of the air stream, for instance, is discharged and released by a bypass valve.

According to an alternative embodiment, largely all of the air stream is guided in and directed through the metering unit. Optionally, only a part of the air stream is guided through the metering unit or in the outlet tube, respectively, and preferably carries the granular material therein. In an alternative embodiment, the granular material has sufficient kinetic energy such that it is largely conveyed in the desired manner and discharged through the outlet tube by its own kinetic energy.

It can furthermore be provided that the circular arcs of the outlet tube and the inner cover surface of the metering unit tangentially touch and that the air-guiding path and the grain-guiding path steplessly or seamlessly merge into each other. It is optionally possible that a radius of curvature of the outlet tube opens continuously or discontinuously with increasing distance from the metering unit. Alternatively, the radius of curvature of the outlet tube can be approximately constant, at least in a section abutting the metering unit. By means of the method according to the invention, the granular material to be spread can be guided in the outlet tube largely collision-free and/or swirl-free, since it approximately follows the path of the outlet tube in its movement path.

A velocity gradient of the airflow being guided in the outlet tube, which velocity gradient increases from the inner to the outer radius, is advantageous for a largely collision-free course of movement of the grains within the outlet tube. This means that the air carrying the grains, which is closer to the outer radius, flows faster than the air being guided along the inner radius. It has been shown by experiments that the grain velocity tends to be higher near the outer radius of the curved outlet tube than near the inner radius, although the velocity differences partly turn out to be very small, depending on the experimental conditions. Nevertheless, velocity differences in lower, single digit percentage ranges, in ranges from approximately 0.3 to approximately 3%, can be determined.

If a largely collision-free grain conveyance is referred to in the present context, this relates to collisions of the grains among each other, which can be largely prevented by means of the method according to the invention as well as by means of the operation of the metering apparatus according to the invention. An approximately swirl-free grain conveyance accordingly relates to a grain transport, which approximately follows the tube path of the feed tube and of the outlet tube as well as the circular movement path along the housing of the metering apparatus.

In an alternative method, the granular material is guided within the metering unit with mechanical support and/or under at least partial separation from the carrying airflow along an inner cover surface or inner wall, with approximately equal spacing from one another being imposed on the individual grains approaching the outlet tube. This alternative method has the advantage that the airflow carrying the granular material is guided uninterruptedly from the feed tube, through the metering unit, and to the outlet tube. In addition, the airflow being guided through the outlet tube and carrying and conveying the granular material, which is conveyed in approximately equal spacing can thus be optionally accelerated within the metering unit such that the airflow accelerated in the metering unit enters into and exits from the outlet tube at a speed that is greater than a feed speed at which the airflow enters into the feed tube. It should be mentioned, however, that this acceleration of the grain-conveying air is for the main part influenced by the different tube cross sections because the outlet tube normally has a smaller cross section than the feeding tube or the seed tube, respectively, which leads, for instance, from a central distributor head to the seed drill coulters. The grain is accelerated in the metering apparatus and is here already surrounded by the airflow, which conducts and carries the grains into the downpipe and to the seed drill coulter. Generally, the mentioned acceleration of the conveying air within the metering unit is not necessarily required; the metering unit can thus also serve to achieve the desired homogenization of the grain transport without its acceleration.

It can be provided by way of the method according to the invention that the granular material being carried and conveyed by an airflow is tangentially directed through a feed line running, at least along a section, in a straight line, into a metering unit, where it is guided along an approximately circular arc path with an arc angle of at least 180 degrees, preferably, however, of approximately 270 degrees or more, under at least partial separation of the granular material from the carrying and conveying airflow and tangentially directed into an outlet tube, which is adjacent to the metering unit and which runs, at least along a section, in a straight line or slightly curved, with the granular material, which is approximately evenly metered and/or equidistantly conveyed therein, being carried largely or completely by the airflow being discharged and exiting the metering unit through the outlet tube. The granular material or the seeds as well as the airflow carrying the material can execute, for instance, a complete rotation in the metering unit, which preferably has a disk-shaped construction, before being led into the outlet tube, which follows a curved path. It can thus be provided in the method that the airflow, which is tangentially directed into the metering unit, is guided therein along an approximately circular arc path with an arc angle of approximately 330 to 390 degrees, and tangentially directed into the outlet tube. Since the air stream is not interrupted at any point, but rather directed uninterruptedly and along a largely evenly curved path (with tangential passages) through the metering unit, the airflow, which is in this manner greatly steadied and homogenized, can be used, in connection with steering, directing, and/or separating effective elements within the metering unit, for largely homogenizing the grain distances such that the grains, which are guided through the outlet tube, have both largely the same grain velocities and largely the same spacing relative to one another.

Optionally, the granular material can be guided within the metering unit with mechanical support and/or under at least partial separation from the carrying airflow along an inner cover surface or inner wall, with approximately equal spacing from one another being imposed on the individual grains approaching the outlet tube. In this connection, it can be provided that the airflow is guided in an internal area of the metering unit and at least partially spaced apart from the grain-conducting areas of the inner cover surface or inner wall. In the process, the airflow carrying and conveying the granular material is guided uninterruptedly from the feed tube, through the metering unit, and to the outlet tube.

In a further alternative embodiment, it can be provided that the airflow being guided through the outlet tube and carrying and conveying the granular material, which is conveyed in approximately equal spacing, is accelerated within the metering unit, which acceleration can be carried out, for instance, by means of a rotating conveyor disk and/or fan disk. In this manner it can be achieved that the airflow having been accelerated in the metering unit enters into and exits from the outlet tube through an outlet at a speed that is greater than a feed speed at which the airflow enters into the feed tube. In this alternative embodiment, the acceleration of the airflow is also not imperatively required. The rotating conveyor disk and/or fan disk can also essentially serve for producing the desired longitudinal distribution of the grains, without the acceleration of the air or of the grain transport, respectively, being required.

In this context, it can also be an advantage for the outlet tube to have a tapering cross section such that the speed of the airflow being guided in the outlet tube, and thus of the grains being carried by the airflow, increases as the distance from the metering unit increases and with the tube cross section of the outlet tube decreasing. If the grains are thus evenly accelerated in the direction toward the tube outlet or the point of release into the soil, respectively, by the targeted tapering of the cross section of the outlet tube, this can serve, either per se and/or in combination with the even grain conveyance at the outer radius of the curved outlet tube, for a targeted improvement of the even grain spacing and thus for a more precise longitudinal distribution of the grains on being placed.

The present invention furthermore comprises a metering apparatus for granular material, such as seeds, fertilizer, or the like, which can, in particular, be a component of a distribution unit or a sowing unit of a distribution machine or a sowing machine. The metering apparatus according to the invention comprises a metering unit, into which a feed tube leads for receiving an airflow and conveying it into the metering unit. The airflow carries and conveys the granular material. In addition, the airflow is guided along an approximately circular arc path within the metering unit and is tangentially conducted into an outlet tube, which is adjacent to the metering unit and which is slightly curved, at least in sections. It can furthermore be provided that the circular arcs of the outlet tube and the inner cover surface of the metering unit tangentially touch and that the air-guiding path and the grain-guiding path steplessly or seamlessly merge into each other. Also, a radius of curvature of the outlet tube is approximately constant, at least in a section abutting on the metering unit. It can optionally be provided that the radius of curvature of the outlet tube opens continuously or discontinuously with increasing distance from the metering unit.

Optionally, a variant of the metering apparatus provides that the granular material is guided within the metering unit with mechanical support and/or under at least partial separation from the carrying airflow along an inner cover surface or inner wall, with approximately equal spacing from one another being imposed on the individual grains approaching the outlet tube. In this process, the airflow carrying the granular material is guided uninterruptedly from the feed tube, through the metering unit, and to the outlet tube. In addition, the mechanical support enables an acceleration of the air within the metering unit such that the airflow being guided through the outlet tube and carrying and conveying the granular material, which is conveyed approximately equidistantly, can be accelerated within the metering unit.

As mentioned, the metering apparatus according to the invention can comprise a feed line running, at least along a section, in a straight line, for steering a feed airflow carrying and conveying the granular material, wherein this feed line can lead, in particular, tangentially into the metering unit. The metering unit has an air guide and grain guide with an approximately circular arc path with an arc angle of at least approximately 180 degrees, and preferably of approximately 270 degrees or more. It can furthermore be provided that an outlet tube running, at least along a section, in a straight line or slightly curved, is guided from the metering unit in a tangential direction. An at least partial separation of the granular material from the carrying and conveying airflow is carried out in the metering unit, with the airflow being tangentially directed into the metering unit and tangentially directed out of it. It is furthermore provided that a curvature of the outlet tube, which curvature extends evenly or in a crescent-shape as the distance from the metering unit increases, is tangentially adjacent to a grain-conducting inner wall of the metering unit such that neither the airflow nor the grains being conveyed therewith undergo an abrupt grain deflection. Rather, the airflow carrying the granular material is guided uninterruptedly from the feed tube, through the metering unit, and to the outlet tube, ensuring, at the same time, an evenly curved deflection in the area of the metering unit as well as an even grain spacing at least in the area of the outlet tube.

In one alternative embodiment of the metering apparatus, the airflow being guided through the outlet tube and carrying and conveying the granular material, which is conveyed approximately equidistantly, can be accelerated within the metering unit, wherein, in particular, a rotating conveyor disk and/or fan disk can be provided, which accelerates the airflow in the metering unit. Preferably, this rotating conveyor disk and/or fan disk, which is to be understood as being optional, rotates approximately concentrically within the metering unit. In addition, an electromotive drive can be provided for the conveyor disk or fan disk rotating approximately concentrically within the metering unit.

As already mentioned above, the acceleration of the grain-bearing airflow is not imperatively required, as the rotating conveyor disk and/or fan disk can essentially also be employed for imposing the desired longitudinal distribution on the grains without acceleration being carried out in this context. Acceleration of the air is carried out based upon the respective ratio of the quantity of air streaming into the metering unit to the rotational speed of the conveyor disk and/or fan disk.

A further variant of the metering apparatus according to the invention can provide that a cross section of the outlet tube is continuously or discontinuously reduced, at least along a section, as the distance from the metering unit increases. In this manner, it can be achieved that the speed of the airflow being guided in the outlet tube, and thus of the grains being carried by the airflow, increases as the distance from the metering unit increases and as the cross section of the outlet tube decreases. The tapering of the outlet tube, which tapering can be designed to be optionally continuous, continuous along sections, or also discontinuous, provides for an additional acceleration of the air stream and thus of the grains being carried therein in the direction toward the tube outlet or toward the point of release into the soil, respectively, with this acceleration being preferably carried out evenly, this being best achieved by a continuous tapering of the tube cross section. This tapering moreover provides for a steadying of the impacting and rebounding grains, which are not being guided collision-free in the tube. In combination with the even grain conveyance at the outer radius of the curved outlet tube, the tapering can serve for a targeted improvement of the even grain spacing and thus for a more precise longitudinal distribution of the grains being placed.

The described metering apparatus is particularly suitable for placement inline with grain-conducting tubes, in particular in seed tubes of a per se known sowing machine, in particular with such a sowing machine that conveys pneumatically. Such a metering apparatus can be arranged inline with each seed tube, where it can provide for ensuring a distribution approximating single seed distribution. The metering apparatus therefore is an accessory equipment that is suitable for supplementing an existing sowing machine and thus turning it into a grain singulating sowing machine.

In the following passages, the attached figures further illustrate exemplary embodiments of the invention and their advantages. The size ratios of the individual elements in the figures do not necessarily reflect the real size ratios. It is to be understood that in some instances various aspects of the invention may be shown exaggerated or enlarged in relation to other elements to facilitate an understanding of the invention.

FIG. 1 shows a schematic illustration of a pneumatically operating sowing machine with volumetrically-metered seeds, which are guided via a central distributor to individual seed tubes with seed drill coulters arranged thereat on the side of the outlets.

FIG. 2 shows the basic construction of a metering apparatus according to the invention in a schematic illustration, which metering apparatus is arranged inline with a seed tube of a sowing machine according to FIG. 1.

FIG. 3 is a schematic illustration showing the contour of an outlet tube formed as a seed tube, which extends tangentially adjacent to the metering apparatus.

FIG. 4 shows the flow path within the outlet tube in a schematic manner.

FIG. 5 schematically shows a flow path within a variant of the outlet tube with a tapering cross section.

The same or equivalent elements of the invention are designated by identical reference characters. Furthermore and for the sake of clarity, only the reference characters relevant for describing the respective figure are provided. It should be understood that the detailed description and specific examples of the device and method according to the invention, while indicating preferred embodiments, are intended for purposes of illustration only and are not intended to limit the scope of the invention.

The schematic illustration of FIG. 1 shows a pneumatically operating sowing machine 10 with volumetrically-metered seeds, which are guided via a central distributor to individual seed tubes with seed drill coulters arranged thereat on the side of the outlets. The sowing machine 10, the basic construction of which is known from the prior art, typically has a funnel-shaped storage hopper 12 for granular material, in particular for seeds, at the underside of which storage hopper 12 is a metering device 14, which meters the granular material or the seeds, respectively, into an air stream 16, which is generated by an air blower 18 and conveyed into an air duct 20, which leads to a vertically arranged riser pipe 22. A central distributor 24 is arranged at a top side of the riser pipe 22—which can be, for instance, a so-called corrugated pipe or the like—which central distributor 24 distributes the grain-bearing air stream 26 as evenly as possible to a multitude of seed tubes 28. The individual seed tubes 28, only one of which is shown for the sake of clarity, each eventually lead to seed drill coulters 30 with which the seeds are placed into the soil 32. The metered feeding of the seeds or granular material released from the storage hopper 12 into the air stream 16 can be optionally carried out according to the Venturi principle or also by support of the seeds that are located, under pressure, in the closed pressure tank 12.

Figure 1:
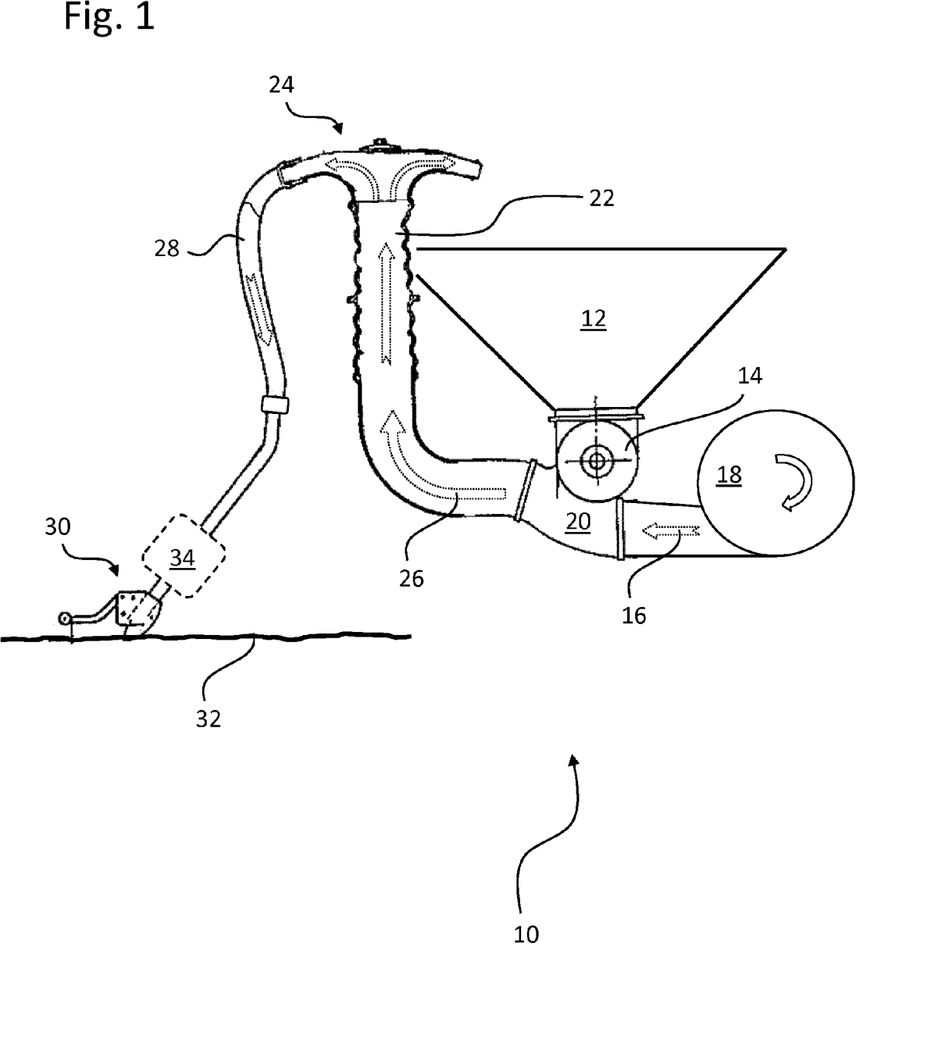

As can be discerned from FIG. 1, a metering apparatus 34 according to the invention is located in line with the seed tube 28, typically in the immediate vicinity to the seed drill coulter 30, which metering apparatus 34 provides for supplying the seed drill coulter 30 with granular material or with seeds, respectively, which is or are released at approximately equal spacing and at largely the same respective conveying speeds into the soil 32. Since in a real sowing machine a multitude of such parallel seed drill coulters 30 are provided (for example twenty-four, thirty-two, or more), which are each connected with separate seed tubes 28 and supplied by them, a corresponding number of metering apparatuses 34 according to the invention, which are each constructed in the same manner, are also provided, because each individual seed tube 28 has such a metering apparatus 34.

Figure 2:
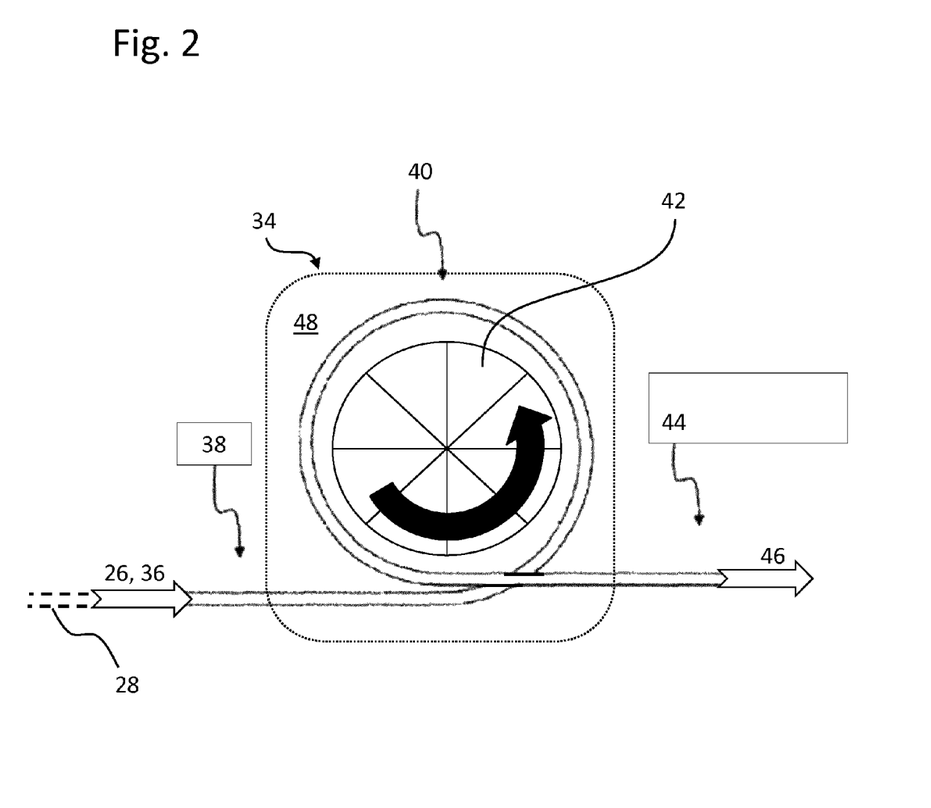

FIG. 2 shows the basic construction of a metering apparatus 34 according to the invention in a schematic illustration, which metering apparatus 34 is arranged in line with a seed tube 28 of a sowing machine 10 according to FIG. 1. The grain-bearing air stream 26 thus tangentially streams as feed air 36 at a first speed $v_1$ through a feed tube 38 arranged in line with the seed tube 28 into the metering apparatus 34, wherein the feed air 36 can be accelerated by means of a conveyor disk and/or fan disk 42 rotating in the metering unit 40 of the metering apparatus 34. The grains (for instance, seeds) being carried and conveyed in the feed air 36 are thereby simultaneously sorted and brought into an order relative to each other in such a manner that they have approximately the same spacing from each other upon tangentially exiting the metering unit 40 into an outlet tube 44. The conveying air 46 or grain-bearing airflow which is accelerated in the metering unit 40, exits from the outlet tube 44 at a higher speed ($v_2$) than that at which it enters into the feed tube 38, such that the following applies:

$v_2 > v_1$.

Figure 3:
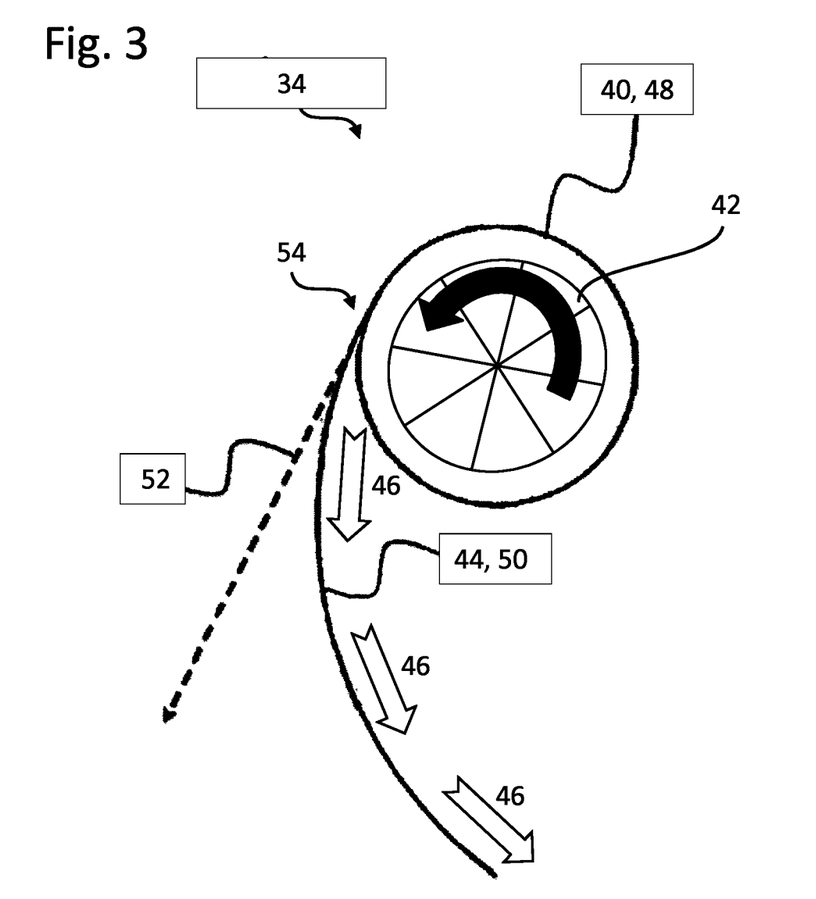

Both the feed tube 38 and the outlet tube 44 end respectively approximately tangentially at the metering unit 40 of the metering apparatus 34, in which the air, together with the carried and conveyed grains, undergoes a deflection of preferably at least 330 degrees, typically of approximately 360 degrees. The outlet tube 44 can subsequently lead into a seed tube (cf. FIG. 3), which leads to the seed drill coulter 30 (cf. FIG. 1), with which the grains are placed into the soil 32. The outlet tube 44 can optionally have a crescent-shaped curvature, which takes up the curvature of the air conveyance path within the metering unit 40 and continues it with a larger radius of curvature. As shown in FIG. 3, the curved outlet tube 44 extends outward and in spaced relation away from the metering unit.

As can be discerned from the schematic illustration of FIG. 2, the air stream is guided uninterruptedly from the supply (air blower 18) to the release at the seed drill coulter 30 (cf. FIG. 1) such that the complete air stream passes through the entire system before exiting at the seed drill coulter 30 together with the transported and largely equidistantly released grains. The conveyor disk and/or fan disk 42 in the metering unit 40 can be optionally driven by a motor, in particular by an electric motor. Normally, the grains are—at least partly—separated from the air stream within the metering unit 40, wherein the grains being guided on the outside also describe a circular arc movement when they are guided along the inner cover surface of the metering unit 40. The air stream is normally guided on a smaller radius in the inner area of the metering unit 40 and can swirl there, as the case may be, before again carrying away the grains having been delivered into the outlet tube 44 at its tangential outlet. The grains being conveyed with the air 46 exiting through the outlet tube 44 are particularly suited for the precise placement into the soil 32 because their speed and position are controllable very accurately. The method shown provides for the desired grain acceleration within the metering unit 34 or 40, respectively, and can largely do without further auxiliary means, such as an additional air supply.

The seeds initially move at a constant speed ($v_1$), which is predetermined by the air speed of the conveying air 26. This conveying air 26 originates from the central air supply of the pneumatic sowing machine 10, in which the grains are metered into the air stream 16, which originates from the air blower 18 (Venturi principle or pressure tank principle). The air speed is increased in the metering apparatus 34 by the rotation of the mechanically operated conveyor disk/fan disk 42, whereby the air speed ($v_2$) of the air exiting from the outlet tube 44 is increased and thus also the conveying speed for the grains. These are subsequently released nearly without braking to the seed conduit.

The schematic drawing of FIG. 3 illustrates some important aspects of the method according to the invention as well as the metering apparatus 34 according to the invention. This metering apparatus thus has the air feed line 38 shown in FIG. 2 to its housing 48, in which the conveyor disk or fan disk, respectively, rotates, driven by an electric motor. The entering feed air 36 flows through the metering unit 40 and exits tangentially through the outlet tube 44. The instreaming air 36 carries the granular material to be distributed, in particular the seeds, which are at least partly to be separated from the airflow being guided through the metering unit 40 and homogenized, i.e. brought into largely even spacing from each other, within the metering unit 40. The outlet tube 44, which is designed as a downpipe or as a seed conduit 50, deviates from the straight tangential path 52 (dashed line) and has an even or opening curvature, which follows the curvature of the housing 48 of the metering apparatus 34, however with an increasing radius, which starts at the tangential passage 54 to the downpipe 50.

Not clearly discernible in FIG. 3 is a curvature path of the seed conduit 50, which curvature path, as the case may be, can slightly reduce toward its lower outlet opening, which is located near the ground 32. Since a catcher roller or the like (not illustrated here) can reasonably be arranged in the area of the seed drill coulter 30, which catcher roller serves for preventing the grains being conveyed quickly into the soil from undesired bouncing, it can be reasonable, according to the arrangement of the metering apparatus 34 in the area of the seed tube 28, to adapt the curvature of the seed conduit 50 thereto, which could necessitate a reduced curvature in the area of the lower outlet of the seed conduit 50.

As is illustrated by FIG. 4, the grains essentially move along the outer contour 56 in the downpipe 50 or the outlet tube 44, respectively. The metering unit 40 is devised such that the grains move in the metering unit 34 along a wall or the inner cover surface, respectively. In its course, the downpipe 50 follows the contour of this inner cover surface tangentially, although with an increasing radius of curvature. The seed pipe or downpipe 50 (outlet tube 44) is designed to be approximately crescent-shaped, whereby the seeds can continue to follow the already assumed circular path. In this way, collisions of the grains in the seed tube 50 and thus an undesired bouncing and imprecise release of the seeds at the lower end of the downpipe 50 and its outlet to the seed drill coulter 30 can be avoided or prevented, respectively.

Figure 4:
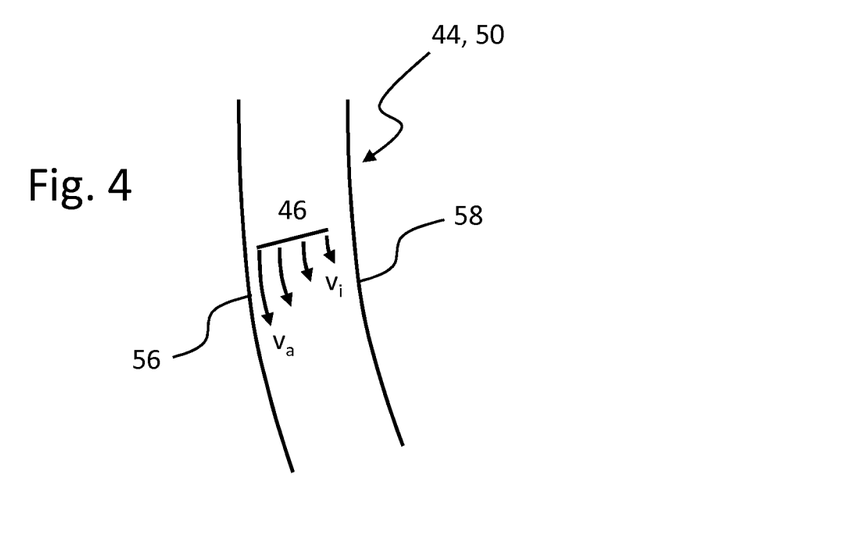

It is discernible from FIG. 4 that the air speed at the outer area 56 of the curved outlet tube 44 is greater than at the inner area 58 of the curvature ($v_a > v_i$) so that the grains being carried by the airflow 46 at the outer area 56 are also located in the area of the faster airflow ($v_a$). By the largely even and swirl-less flow, the grains hardly collide with the walls of the seed tube 50 and thus retain their spacing from one another. This enables the largely equidistant grain release at exactly definable distances and at a definable release speed. The feed air 36 in the feed tube 38 can, for instance, have a speed of approximately 20 m/s, wherein the grains being carried in the air can typically have a slightly lower conveying speed of approximately 10 to 15 m/s. The airflow 46 accelerated by the quickly rotating conveyor disk or fan disk 42, respectively, and exiting through the outlet tube 44 or the seed conduit 50, respectively, can have a slightly higher flow speed of, for instance, 25 m/s. This means that the airflow 46, and thus the grains being carried along, are clearly accelerated in comparison to the entry 38. In this context it should be mentioned, however, that the acceleration of the airflow in the area of the metering apparatus 34 is primarily due to the narrower tube cross sections of the outlet tube 44 in comparison to the feed tube 38.

Figure 5:
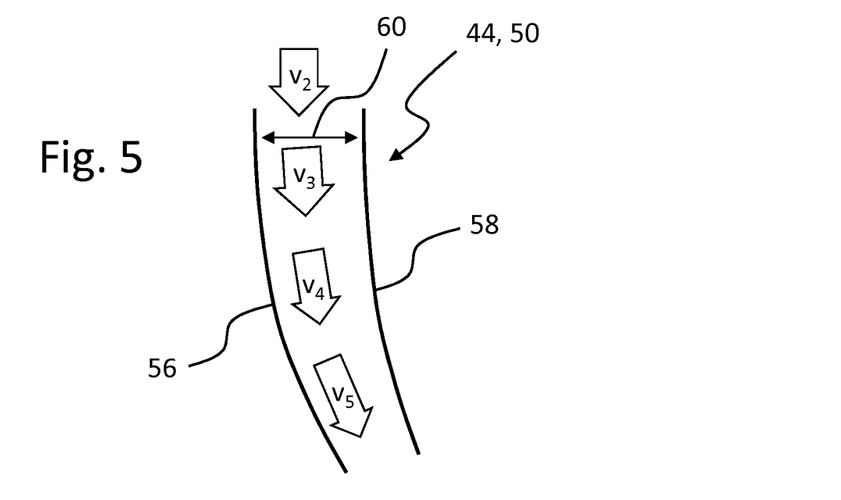

The schematic view of the longitudinal cut in FIG. 5 exemplarily shows a flow path within a variant of the outlet tube 44, the cross section of which tapers in its course in flow direction. It is discernible there that the tube cross section 60 of the outlet tube 44 is reduced with increasing distance from the metering unit. As is discernible by means of the indicated arrows, which are intended to characterize the airflow 46, the speed of the airflow 46 being guided in the outlet tube 44, and thus also the speed of the grains being carried by the airflow 46, in this manner increases with increasing distance from the metering unit and with decreasing tube cross section 60 of the outlet tube 44. With the speed of the airflow exiting from the metering unit being defined above as the speed $v_2$, the following applies according to FIG. 5 for the speed increasing downward:

$$v_5 > v_4 > v_3 > v_2.$$

The tapering of the outlet tube 44 or the reduction of the tube cross section 60, respectively, which is preferably designed to be continuous or at least continuous along a section and which is schematically indicated in FIG. 5, provides for a renewed acceleration of the air stream 46 downstream from the metering unit, and thus also for an acceleration of the grains being carried therein in the direction toward the tube outlet or toward the point of release into the soil, respectively. Since this acceleration is carried out largely evenly or continuously, it can provide for steadying of impacting and rebounding grains that are not being guided collision-free in the tube 44. In combination with the even grain conveyance at the outer radius of the curved outlet tube 44, the tapering can serve for a targeted improvement of the even grain spacing and thus for a more precise longitudinal distribution of the grains on being placed.

The invention has been described with reference to a preferred embodiment. Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

LIST OF REFERENCE CHARACTERS

10 Sowing machine
12 Storage hopper
14 Metering device
16 Air stream
18 Air blower
20 Air duct
22 Riser pipe (corrugated pipe)
24 Central distributor, central distribution
26 Grain-bearing air stream, grain-bearing airflow
28 Seed tube
30 Seed drill coulter
32 Ground, soil
34 Metering apparatus
36 Feed air, feed airflow
38 Feed tube
40 Metering unit
42 Disk, conveyor disk, fan disk
44 Outlet tube
46 Exiting air (air exiting the metering apparatus)
48 Housing
50 Downpipe, seed conduit
52 Tangential path
54 Tangential passage
56 Outer contour, outer area, external area
58 Inner contour, inner area, internal area
60 Tube cross section

The invention claimed is:

1. A method for metering granular material within a distribution unit of a distribution machine or a sowing unit of a sowing machine, comprising directing the granular material entrained in a stream of air through a feed tube into a metering unit; guiding the stream of air within the metering unit along an approximately circular arc path; and directing the stream of air and entrained granular material approximately tangentially out of the metering unit and into an outlet tube, which extends downward and in spaced relation away from the metering unit and which is curved at least along a section of the outlet tube extending downward and in spaced relation away from the metering unit so that the granular material is directed downward and away from the metering unit in an arcuate path through the section of the outlet tube that is curved.

2. The method as recited in claim 1, in which an inner surface of the outlet tube and an inner surface of a housing of the metering unit abut tangentially and steplessly.

3. The method as recited in claim 1, in which a radius of curvature of the outlet tube increases continuously or discontinuously with increasing distance from the metering unit.

4. The method as recited in claim 1, in which a radius of curvature of the outlet tube is approximately constant, at least in a section adjacent the metering unit.

5. The method as recited in claim 1, in which the granular material is guided within the metering unit with mechanical support along an inner surface of a housing of the metering unit, wherein approximately equal spacing is imposed on individual grains of the granular material approaching the outlet tube.

6. The method as recited in claim 5, in which the stream of air being guided through the outlet tube and carrying and conveying the granular material, which is being conveyed in approximately equal spacing, is accelerated within the metering unit.

7. The method as recited in claim 6, in which the stream of air is accelerated in the metering unit, and enters into and exits from the outlet tube at a speed that is greater than a feed speed at which the airflow enters into the feed tube.

8. The method as recited in claim 1, in which the stream of air, in which the granular material is entrained, is guided uninterruptedly from the feed tube, through the metering unit, and to the outlet tube.

9. The method as recited in claim 1, in which the speed of the stream of air being guided in the outlet tube increases as the distance from the metering unit increases and as the cross section of the outlet tube decreases.

10. A metering apparatus for granular material, which is a component of a distribution unit of a distribution machine or a sowing unit of a sowing machine, metering apparatus including a metering unit, a feed tube leading into the metering unit and an outlet tube extending outward from the metering unit, the feed tube receiving a stream of air having granular material entrained therein and directing the stream of air with granular material entrained therein into the metering unit, the metering unit having a housing with an inner surface defining an arcuate path therein, wherein the stream of air is guided within the metering unit along the arcuate path and the stream of air with granular material entrained therein is directed approximately tangentially into the outlet tube, which extends from a passage out of the housing of the metering unit extending tangential to the arcuate path within the metering unit, and the outlet tube, at least along a section, is curved at a radius greater than the radius of the arcuate path, and wherein an inner surface of the outlet tube and the inner surface of the housing of the metering unit tangentially abut and steplessly merge into each other, and wherein a radius of curvature of the outlet tube is approximately constant, at least in a section adjacent the metering unit.

11. The metering apparatus as recited in claim 10, in which the radius of curvature of the outlet tube increases continuously or discontinuously with increasing distance from the metering unit.

12. The metering apparatus as recited in claim 10, in which the radius of curvature of the outlet tube decreases in a direction toward an outlet from the outlet tube.

13. The metering apparatus as recited in claim 10, in which the granular material is guided within the metering unit with mechanical support along an inner surface of the housing of the metering unit, wherein the mechanical support imposes approximately equal spacing among individual grains of the granular material approaching the outlet tube.

14. The metering apparatus as recited in claim 10, in which an inner diameter of the outlet tube is continuously or discontinuously reduced, at least along sections, as the distance from the metering unit increases.

15. A metering apparatus for granular material which is a component of a distribution unit of a distribution machine or a sowing unit of a sowing machine, the metering apparatus including a metering unit, a feed tube leading into the metering unit and an outlet tube extending outward and in spaced relation away from the metering unit, the feed tube receiving a stream of air having granular material entrained therein and directing the stream of air into the metering unit, the metering unit having a housing with an inner surface defining an arcuate path therein, wherein the stream of air is guided within the metering unit along the arcuate path and the stream of air with granular material entrained therein is directed into the outlet tube which extends from a passage out of the housing of the metering unit extending approximately tangential to the arcuate path, and the outlet tube is curved at a radius greater than the radius of the arcuate path, at least along a section of the outlet tube extending in spaced relation away from the metering unit.

16. The metering apparatus as in claim 15 wherein the radius of curvature of the outlet tube is approximately constant, at least along the section adjacent the metering unit.

17. The metering apparatus as in claim 15 in which an inner surface of the outlet tube and the inner surface of the housing of the metering unit around the passage out of the housing abut and steplessly merge into each other.

18. The metering apparatus as in claim 15 in which the radius of curvature of the outlet tube increases continuously or discontinuously with increasing distance from the metering unit.

19. The metering apparatus as in claim 15, in which the radius of curvature of the outlet tube is approximately constant, at least in a section adjacent the metering unit.

20. The metering apparatus as in claim 15 in which a cross section of the outlet tube is reduced, at least along sections, as the distance from the metering unit increases.

21. The metering apparatus as in claim 15 wherein the outlet tube extends downward from the metering unit and opens proximate a coulter.

* * * * *